(No Model.) 3 Sheets—Sheet 1.
J. DRING.
MANUFACTURE OF WHEEL RIMS.
No. 557,196. Patented Mar. 31, 1896.
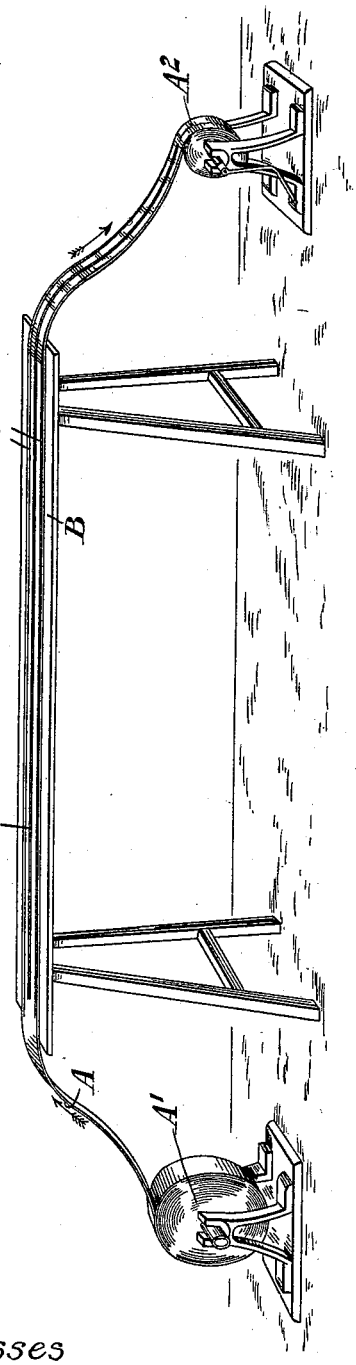
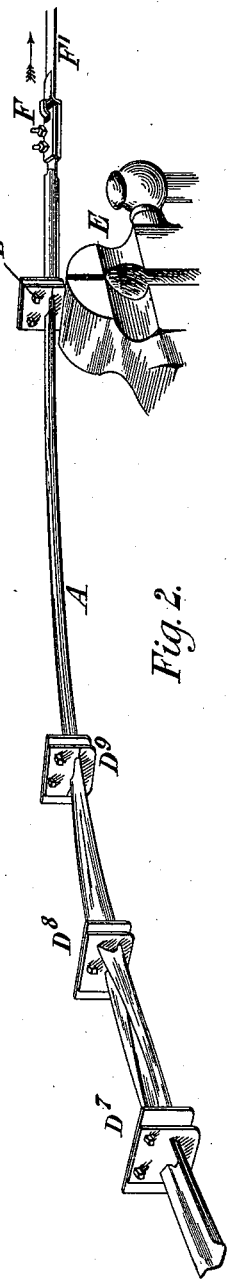
Witnesses
Inventor
John Dring
By Foster and Freeman
Attorneys (No Model.) 3 Sheets—Sheet 2.
J. DRING.
MANUFACTURE OF WHEEL RIMS.
No. 557,196. Patented Mar. 31, 1896.
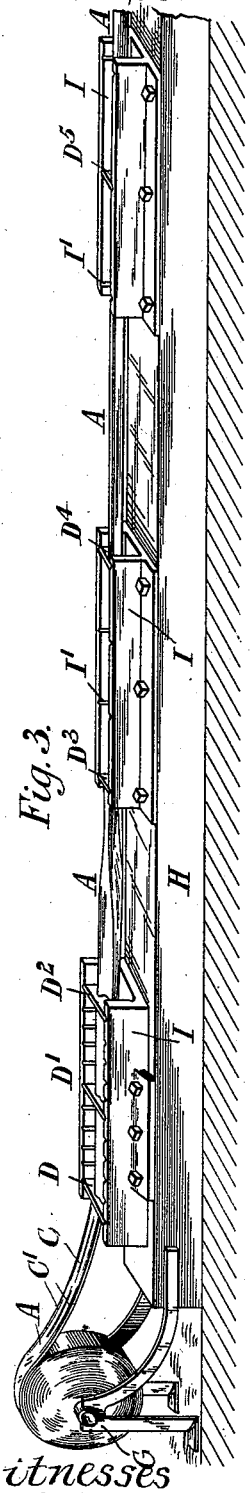
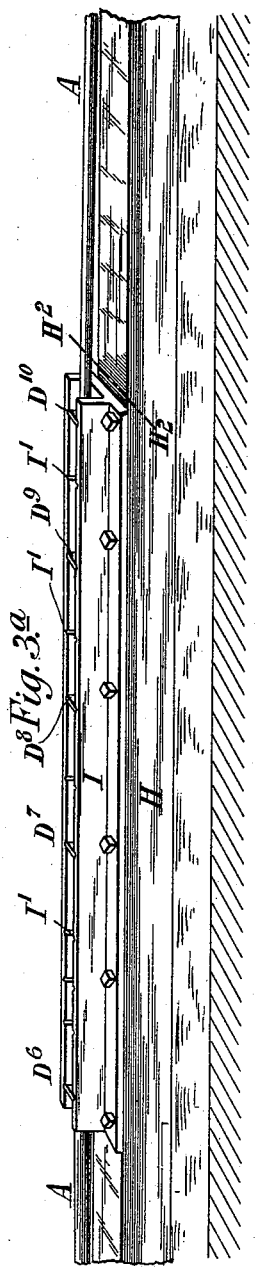
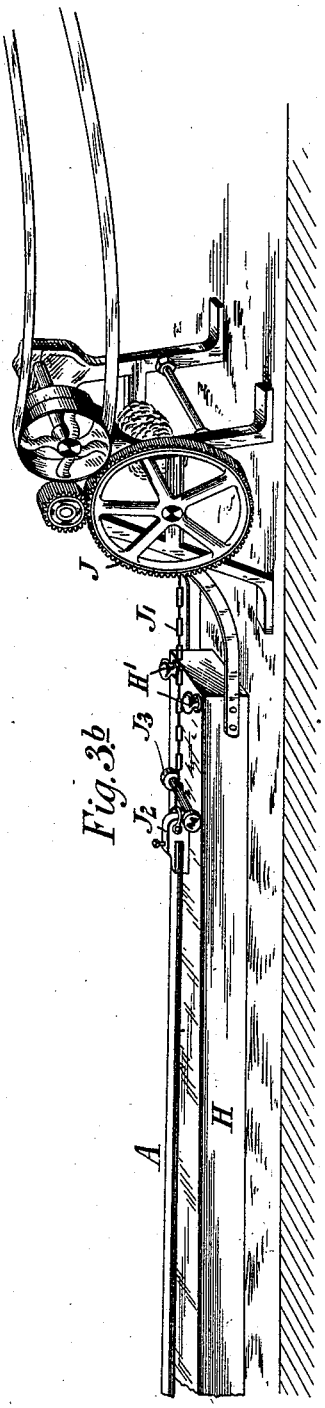
Witnesses
Jno. G. Hinkel
E. E. Ellis
Inventor
John Dring
By Foster and Freeman
Attorneys (No Model.)     J. DRING.     3 Sheets—Sheet 3.
MANUFACTURE OF WHEEL RIMS.
No. 557,196.     Patented Mar. 31, 1896.
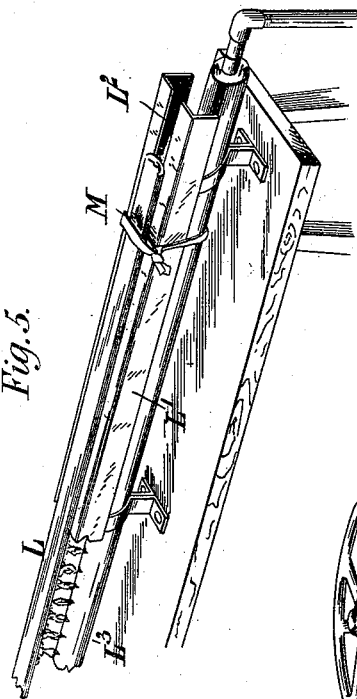
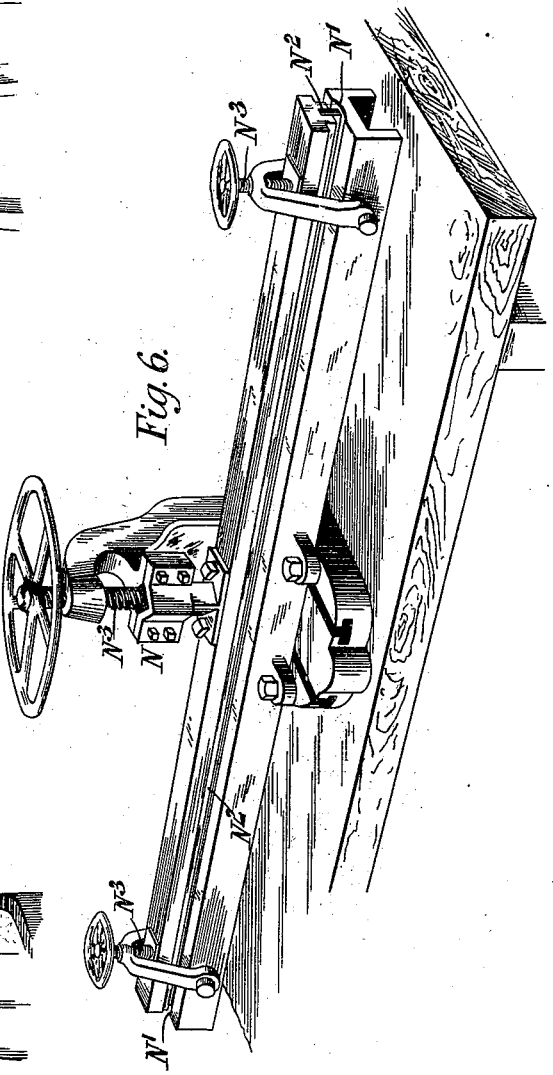
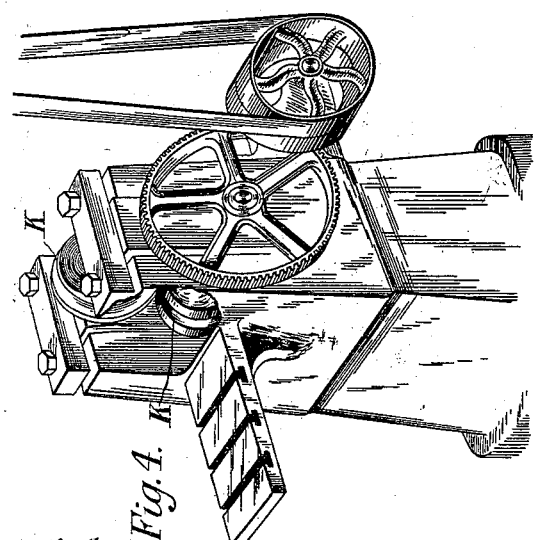

UNITED STATES PATENT OFFICE.

JOHN DRING, OF LONDON, ENGLAND, ASSIGNOR TO THE DOUBLE HOLLOW RIM COMPANY, LIMITED, OF SAME PLACE.

MANUFACTURE OF WHEEL-RIMS.

SPECIFICATION forming part of Letters Patent No. 557,196, dated March 31, 1896.

Application filed April 17, 1895. Serial No. 546,144. (No model.)

*To all whom it may concern:*

Be it known that I, JOHN DRING, a subject of the Queen of England, residing at London, England, have invented certain new and useful Improvements in or Relating to the Manufacture of Wheel-Rims, of which the following is a specification.

This invention relates to the manufacture of wheel-rims, particularly those employed with pneumatic tires. The rims are made of metal drawn through a succession of dies of varying shapes until the completed rim is produced.

The invention may be carried into practice in the manner hereinafter described, and illustrated in the accompanying drawings, which comprise a series of perspective views of the various devices employed.

Figure 1 represents the tinning-table; Fig. 2, the manner of preliminarily inserting the blank or strip into the dies. Figs. 3 and $3^a$ are continuations of the same figure, the series of dies and drawing apparatus and a strip of metal in course of bending to the desired section; Fig. 4, a rolling-machine through which the strip may be passed after it leaves the apparatus shown in Figs. 3 and $3^a$; Fig. 5, the gas-heating or soldering apparatus, and Fig. 6 the press for compressing the rims while the solder sets.

Like letters indicate like parts throughout the drawings.

In carrying the invention into practice a strip A of metal, preferably steel, of the required width and of any desired length, is taken in the roll or wound upon a drum or axle, as shown at A', Fig. 1, and this, when unrolled and extending along the table B, is tinned for soldering purposes in three lines— namely, one down the center, as at C, and one, C', at each edge—after which it may be again wound into a roll, as shown at $A^2$, Fig. 1. The strip A is then passed through the first of the dies D, D', $D^2$, $D^3$, $D^4$, $D^5$, $D^6$, $D^7$, $D^8$, $D^9$, and $D^{10}$, and thereafter through the second and third, and so on until all of the dies occupy the same or approximately the same relative positions on the strip which they are to do when afterward placed in the supporting-racks. A convenient way of doing this is as follows: Each die in its turn is secured in a vise E, as shown in Fig. 2, and the end of the strip is bent by hand or otherwise, so as to allow it to be passed through the die. A screw-clamp or equivalent device F, connected, say, by a band F' to a winch or the like, (not shown in the drawings,) is then attached to the end of the strip, so that when this winch is operated the strip is drawn through the particular die which at the time is fixed in the vise E. The winch is stopped as soon as the die occupies the position on the strip which it is required to do when subsequently fitted into its supporting-rack. For example, assuming that the distance between the dies D, Fig. 3, and $D^{10}$, Fig. $3^a$, is, say, about nine feet, then the winch should be stopped when somewhat more than nine feet of the strip has been drawn through the die D, the slight excess allowing for the part to which the clamp F is attached. The clamp F is then detached from the end of the strip A and the die D removed from the vise E, the next die D' of the series being next placed in the vise and the strip A drawn through it in a similar manner to the foregoing. Then assuming that the distance between the dies D D', Fig. 2, is, say, ten inches, the winch is stopped as soon as the die D, previously threaded on and then traveling with the strip, is ten inches away from the then stationary die D', and so on throughout the series. In Fig. 2 are shown the last four of the dies—viz., $D^7$, $D^8$, $D^9$ and $D^{10}$—the last named of which is the finishing-die. The roll $A^2$ is then placed in the bearings G at one end of the drawing-bench H, and the dies D D' to $D^{10}$ (inclusive) are placed in the appropriate grooves I' of the troughs or racks I, which are secured firmly to the bench H, adjacent to whose end opposite to that at which the roll $A^2$ is mounted is provided a preferably power-driven winch or equivalent J. The winch-chain J' is then attached by a screw-clamp or equivalent device $J^2$ to the leading end of the strip A and the winch put into operation, so that the strip will be drawn through all the dies at once, entering the first one, D, in a flat or approximately flat form and leaving the last one, $D^{10}$, in a form substantially that desired to be given to the finished rim. Each succeeding die turns the strip A a little more than the last, and the proper distance between them varies according to the extent to which the metal is turned by each, the quality of the metal, and other circumstances. The die-supporting racks I are provided with a number of grooves I', so that the positions of the dies may be adjusted to suit these requirements.

The strip may be drawn into long lengths of approximately-finished section and afterward divided up into rim-lengths; but as this necessitates great length in the shop it is more convenient to cut the strip a few inches beyond $D^{10}$ as soon as a length sufficient for a rim has left the die $D^{10}$, the clamp $J^2$ being released and reconnected each time a length is cut off.

A convenient way of indicating when a rim-length has been drawn and is ready to be separated from the rest of the strip is to provide two stops H' on the bench H and a cross-bar $J^3$ on the winch-chain J', adapted to strike these stops, a line $H^2$ on the bench H, if desired, serving to indicate the precise part at which the strip is to be severed. Each strip-length is then passed between the rolls K of a rolling-mill or equivalent, such as represented in Fig. 4, to set down the two edges of the strip close against the inside of the strip. Each strip-length when severed is placed on a suitable heater L—such, for example, as shown in Fig. 5. This device may comprise two suitably-supported bearing-bars L', with an intervening space or channel $L^2$ between them, a perforated or slotted burner-tube $L^3$ beneath the channel $L^2$, and connections for supplying a mixture of air and gas to the tube $L^3$, all as shown in Fig. 5. The strip-length is laid along the channel $L^2$ and may be temporarily secured in position by one or more metal bands M (only one is shown in Fig. 5) or other device and heated until the solder on the lines C C', Figs. 1 and 3, runs freely, additional solder being applied at this stage, if found necessary.

From the heater L the strip-length is immediately passed to a press N, such as shown in Fig. 6, having suitable dies or equivalent—say a channeled bolster N' on the bottom and a narrow strip $N^2$ on the top—to fit into the channel of the rim-length A. The press may be operated by one or more screws $N^3$ (or the pressure may be applied by other means) and press the folds of the rim together, holding them until the solder is set.

From the press the rim-strip is taken to an ordinary or any suitable rim-bender (not shown in the drawings)—say, for example, a table to support the rim and a set of adjustable horizontal rolls to curve the rim—which, after passing through the machine, assumes the necessary curve. After leaving the bender the rim is cut to the exact length required, (unless it was originally cut to the precise length, which it is not always desirable to do,) the ends meeting, and a short length of metal of the requisite shape is then inserted, half of it into each end of the rim, and the whole riveted and sweated together, an outside finishing-plate being preferably added and sweated.

The rim is now practically finished, but may be tinned or otherwise dealt with to preserve it from rust and improve its appearance.

The before-described apparatus may be modified without departing from the spirit of the invention, and rims of any desired cross-section, whether hollow or solid, may be produced.

I claim—

1. In the manufacture of metallic wheel-rims, the combination of a drawing-bench comprising a trough constructed to receive dies, one or more dies removably disposed within the trough, and means for drawing the rim through the dies at one operation, the said means comprising in part a stop for the strip, substantially as described.

2. In the manufacture of metallic wheel-rims, the combination of a drawing-bench comprising a number of troughs arranged relatively apart and each of which is constructed to receive one or more shaping-dies, removable dies inserted within the trough at suitable distances apart, means for securing the troughs in place upon the drawing-bench, and means for drawing a metallic strip through the dies within the troughs, substantially as described.

3. In the manufacture of metallic wheel-rims, the combination of a drawing-bench comprising a number of separated troughs arranged longitudinally of the bench and each constructed to receive a number of shaping-dies, shaping-dies within said troughs, means for drawing a metallic strip through said dies simultaneously and comprising in part a stop for the strip, and a drawing-chain, substantially as described.

4. In the manufacture of metallic wheel-rims, the combination of a drawing-bench comprising a number of troughs arranged relatively apart and each constructed to receive vertical dies for shaping the rim, shaping-dies in said troughs, stops at the end of the bench, a clamp for attachment to the free end of the strip, a drawing-chain having a cross-bar engaged by the stops, and means for drawing upon the end of the chain to shape the rim, substantially as described.

5. In the manufacture of metallic wheel-rims, the combination of a drawing-bench comprising a trough constructed to receive dies, a number of dies within the trough, and means for drawing a metallic strip through the dies at one operation, and a drawing-chain, the said means comprising in part a stop for the strip, substantially as described.

6. In the manufacture of metallic wheel-rims, the combination of a drawing-bench comprising a trough constructed to receive dies, dies within the trough, means for drawing a metallic rim through the dies at one operation and comprising in part a stop for the strip, and a clamp for attachment to the free end of the strip, substantially as described.

In witness whereof I have hereto set my hand in the presence of the two subscribing witnesses.

JOHN DRING.

Witnesses:
ALFRED J. BOULT,
HARRY B. BRIDGE.